Patented Mar. 2, 1948

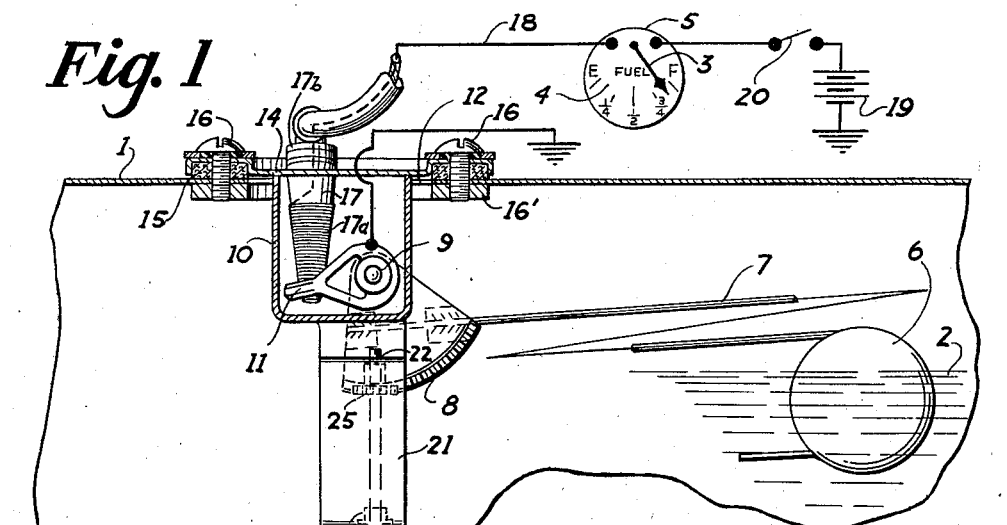
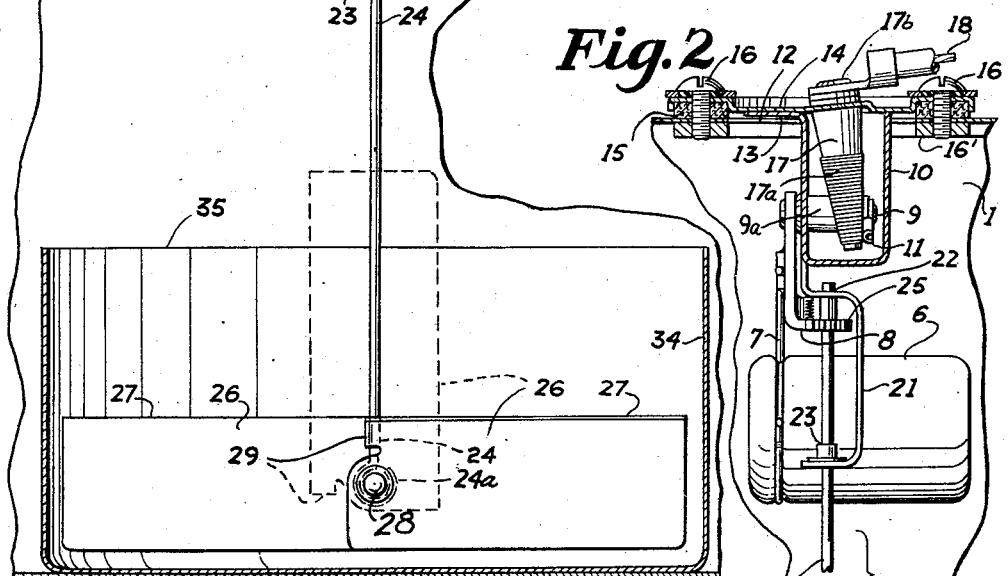
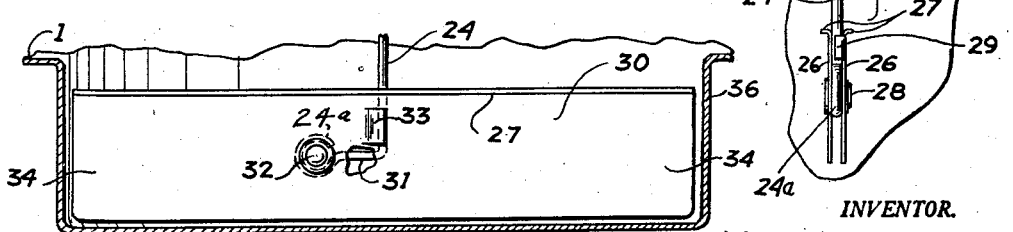

2,437,203

UNITED STATES PATENT OFFICE 2,437,203

FUEL TANK GAGE

William McCandless, Toledo, Ohio

Application May 5, 1945, Serial No. 592,138

8 Claims. (Cl. 73—313)

This invention relates to liquid level gages.

This invention has utility when incorporated in a liquid level gage wherein the level indication is from a container in which the liquid is under a more or less turbulent condition such as the fuel in a tank carried on a vehicle.

The invention is particularly advantageous in eliminating the undesirable oscillations of the pointer on a gage, especially in a magnetic type electrical gage, which is caused by ripples on the surface of or by the surging of the fuel in the tank. This is effected by eliminating the rapid oscillations of the float which controls the mechanism translating oscillations to the needle on an indicator.

An additional feature of the invention is to provide a relatively static portion or region within the body of liquid protected against the general surging of the liquid body as a whole, from which portion the oscillation dampening is controlled.

An additional advantage is to provide a differential between the float movement and the dampening means whereby a positive and nicety of control may be obtained.

Still another advantage is to provide a construction which may be readily inserted or withdrawn through a relatively small aperture of a closed vessel.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of the device mounted in operative position within a tank, parts being broken away and showing the indicator connections diagrammatically;

Fig. 2 is a view from the left of Fig. 1, parts being broken away; and

Fig. 3 is a side elevation of a modified control and tank construction.

A typical installation including the invention is herein shown as being mounted in a container 1 such as the fuel tank of a motor vehicle. This tank may have the usual filler opening (not shown) for introducing a quantity of liquid fuel 2 thereinto. The level of the fuel is indicated by needle 3 moving across dial 4 of an indicator or gage 5, usually of the electromagnetic type and usually mounted on the dash of the tank-carrying vehicle.

The needle is controlled as follows. Float 6, buoyed on the surface of the fuel, is embraced by the free end of arm 7, the remote end of such arm being attached to a gear segment 8 fixed on shaft 9 or otherwise mounted in relation to the shaft, causing the same to rotate as the float rises and falls in response to liquid fluctuations. The shaft 9 is carried by housing 10 through a bearing sleeve 9a and extends thereinto to mount arm 11 movable in response to the shaft rotation to vary the resistance of a rheostatic device to be described hereinafter.

The housing 10 extends through aperture 12 through the tank 1 and is provided with a lip 13. A cover 14 supports the lip 13 and provides a closure for the housing extending over and about the aperture rim to be mounted in place on gasket 15 by screws 16 engaging threaded ring 16'. Mounted on the cover plate 14, a conically-shaped resistance core 17 is provided, extending obliquely into said housing, carrying a coil of resistance wire 17a, along which the free end of arm 11 may wipe in its movement to change the energy flow in circuit 18, thereby operating the indicator 5. The circuit 18 includes terminal 17b, which is mounted in insulated relation with cover 14 and in circuit with resistance coil 17a. The circuit includes a source of energy 19 and a switch 20 which latter is usually opened and closed with the ignition switch of the motor vehicle. The arm 11 is grounded in the usual manner to complete the circuit.

The details of construction of the variable rheostatic device as applied to an electromagnetic telemetric device is disclosed and claimed in my co-pending application Serial No. 562,887 now Patent No. 2,423,603 issued July 8, 1947.

Without some dampening means cooperating with the indicator operating mechanism each and every ripple or wave on the liquid surface moves the float 6 and is instantly translated to the needle so that undesirable oscillations are usually present and are intensified by the roughness of the terrain, over which the vehicle may be passing. This undesirable condition is eliminated by the invention disclosed herein.

To this end, bracket 21 is mounted on the housing 10 to depend therefrom and provide bearings 22, 23 for vertical shaft 24 extending downwardly into the liquid. This shaft carries pinion 25 in mesh with gear segment 8. Mounted on the shaft end remote from the pinion, and submerged in the liquid near the bottom of the tank, is a pair of paddles or vanes 26. The vanes may be made of relatively thin sheet metal having at least one edge 27 offset to supply rigidity thereto and are preferably pivotedly mounted on a stud 28, preferably fixed in an eye 24a on the lower end of the shaft 24 and provided with stops 29 to abut against the shaft in positioning such vanes in operative or approximately diametrically extending relationship. This construction permits the vanes to be folded along the shaft for ready insertion or withdrawal through the aperture 12. The vanes may be easily passed through such aperture and be caused to unfold into operative position as shown in Fig. 1.

In some constructions it may be desirable to employ a single vane 30 and a suitable mounting therefor is shown in Fig. 3 wherein the shaft 24 has offset 31 terminating in an eye embracing stud 32 through the vane and further held in position by clip 33 struck out of the vane to engage the shaft. This single vane may have its wings 34 extend diametrically in opposite directions from the shaft and be reinforced by offset 27.

When the float arm tends to rise or fall with the ripples on the surface of the fuel, it must drive or rotate the vanes in the liquid at a much higher speed relative to its own movement due to the gear ratio between the gear sector 8 and the pinion 25. The resistance of the liquid against the paddles or wings retards to a point of elimination any short, quick movements of the float arm, thus damping out any undesirable oscillations and the subsequent jerking or quivering of the indicating needle 3. The normal, slow movement of the float arm, due to a change in the amount of fuel in the tank, is not affected by the rotation of the paddles to any significant extent for, at very low rates of change, the liquid-resisting factor is practically non-existent.

The operation of the device may be somewhat improved by surrounding the fuel region, in which the blades rotate, by a baffle 34, which may be the rim of an auxiliary pan 35 on the bottom of the tank, as shown in Fig. 1, or by having the blades or paddles located in a depression 36 in the bottom of the tank, as shown in Fig. 3. This eliminates any effect on the rotor by surging of the whole body of the liquid.

The paddles are placed as close to the bottom of the container as possible, so that they are immersed in the liquid at all times, except when the tank is empty beyond the lower limit of the gage. The pan 35 or depression 36 also aids in this feature by retaining a sufficient quantity of liquid to act upon the rotor to the point where the tank proper is empty.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation.

What is claimed and it is desired to secure by United States Letters Patent:

1. In a gage for indicating a liquid level in a container, a float, mechanism for translating to an indicator the rise and fall of the float with the liquid, a member submerged in a segregated portion of the liquid and rotatable therein against the resistance of said liquid, and high ratio toothed gearing means interconnected with said member and mechanism, said gearing operable by movement of said float for rotating said member at a high rate of speed whereby resistance of the liquid to the rotation of the member is imparted to the float; providing a dampener connection against rapid oscillations of the float.

2. In a gage for indicating a liquid level in a container, a float, mechanism for translating to an indicator the rise and fall of the float with the liquid, a member submerged in the liquid and rotatable against the resistance thereof, and motion multiplying means interconnected with said member and mechanism for rotating the member by movement of said float at high angular velocity, whereby resistance of the liquid to the rotation of the member is imparted to the float providing a dampener connection against rapid oscillations of the float.

3. In a gage for indicating a liquid level in a container, a float, means for translating to an indicator the rise and fall of the float, a rotatable member submerged in the liquid, a shaft for support of the member, and gearing between the shaft and said translating means providing a differential between the movements of the float and submerged member whereby resistance of the rotatable member against the liquid is imparted to the float, providing a dampener connection against rapid oscillations of said float.

4. The structure set forth in claim 3 wherein the submerged member includes at least one vane mounted on the shaft for rotary movement therewith against the resistance of the liquid when held in its normal position and having a pivotal connection with said shaft to permit movement with respect thereto and held in normal position by having means engaging the shaft.

5. In a liquid level gage of the class described, a float, a shaft from which the float is swingably mounted and which is rotated by the rise and fall of the float, an arm fixed upon said shaft, indicating mechanism operable by said arm, a gear fixed upon the shaft, a pinion in mesh therewith, a shaft supporting said pinion and extending into the liquid and a submerged member fixed upon said latter shaft whereby the submerged member is oscillated by the rise and fall of said float.

6. The structure of claim 5 wherein the gear is of a substantially greater radius than the pinion.

7. In a gage for indicating a liquid level in a container, a float, mechanism for translating to an indicator the rise and fall of the float with the liquid, a rotatable vane submerged in the liquid and adapted to be rotated against the resistance thereof, motion multiplying means interconnected between said vane and mechanism providing a dampener connection against oscillations of the float, and a baffle about the vane between a portion of the liquid in which the vane rotates and the body of the liquid proper.

8. In a liquid gage of the class described, a float, a shaft from which the float is swingably mounted and which is rotated by the rise and fall of the float, an electric circuit including a resistance, an indicator and an arm fixed to said shaft and having its free end movable along the resistance, a gear fixed upon said shaft, a pinion in mesh therewith, a shaft carrying said pinion and extending into the liquid and a vane in the liquid attached to said latter shaft for rotation by the gear through said pinion.

WILLIAM McCANDLESS.

REFERENCES CITED

The following references are of record in the file of this patent:

UNITED STATES PATENTS

| Number | Name | Date |
|---|---|---|
| 1,481,322 | Kellum | Jan. 22, 1924 |
| 1,930,546 | Bacon | Oct. 17, 1933 |

FOREIGN PATENTS

| Number | Country | Date |
|---|---|---|
| 27,970 | France | June 24, 1924 |
| 377,845 | Italy | Jan. 10, 1940 |